April 12, 1949.                    H. P. WESTER                    2,467,103
                              ARTICLE HOLDING APPARATUS
Filed March 16, 1948                                        2 Sheets-Sheet 1

INVENTOR
H. P. WESTER
BY
W. C. Parnell
ATTORNEY

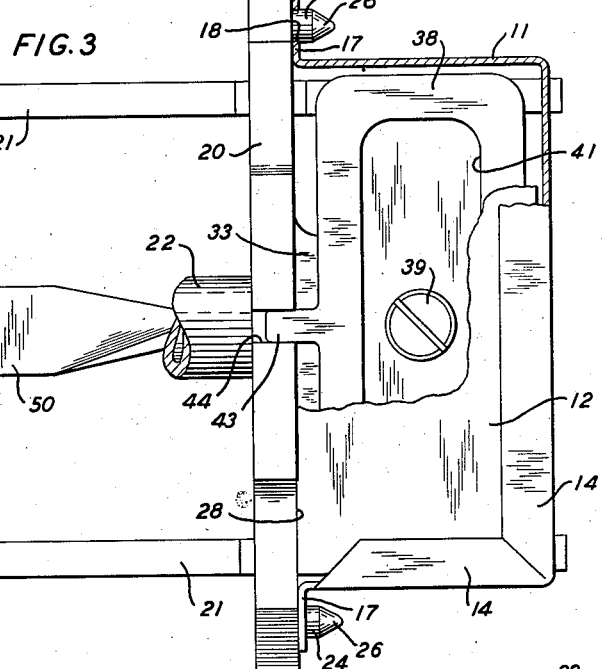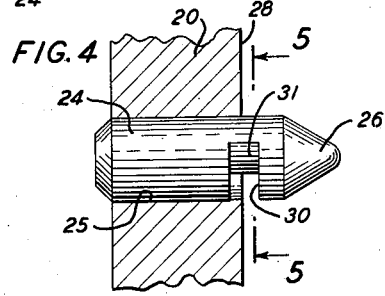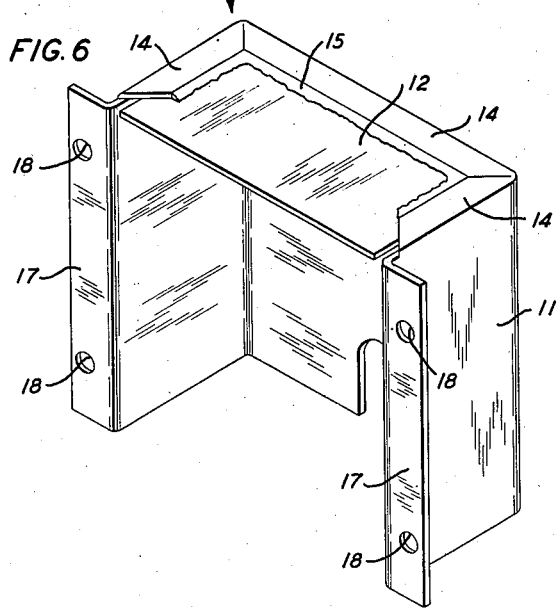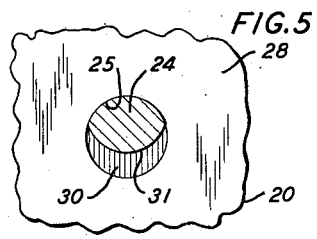

Patented Apr. 12, 1949

2,467,103

UNITED STATES PATENT OFFICE 2,467,103

ARTICLE HOLDING APPARATUS

Henry P. Wester, Chatham, N. J., assignor to Western Electric Company, Incorporated, New York, N. Y., a corporation of New York Application March 16, 1948, Serial No. 15,102

5 Claims. (Cl. 113—103)

This invention relates to article holding apparatus, and more particularly to apparatus for holding parts of an article to be secured together by soldering.

In the communication arts, numerous electrical units are housed in metal containers of various sizes and contours depending upon the size and contour of the electrical units. Certain of the containers are constructed of parts blanked and formed from sheet metal and subsequently soldered together in assembly. Although the parts for the containers may be accurately formed in a blanking and forming machine, the flexible nature of the parts presents a difficult problem of holding the parts accurately while they are secured together by suitable means, such as solder.

An object of the invention is to provide an article holding apparatus which is simple in structure and highly efficient in readily receiving and accurately holding parts of an article for assembly.

With this and other objects in view, the invention comprises an apparatus for holding parts of an article to be secured together, the first part having an open end with an inwardly projecting flange and apertured side flanges, while the second part is formed to close the open end of the first part and engage the flange at the said open end. The apparatus comprises a body with spaced elements receivable in the apertures of the side flanges and recessed to receive portions of the flanges about the apertures and a table for supporting the second part and movable relative to the body member to force the second part firmly against the flange in the open end and thereby move the first part to force the side flanges into locking engagement with the elements.

The body member is normally supported by legs and carries a handle by which the apparatus may be moved into any desired position to facilitate soldering of the parts together. The table supporting the second part, namely the end or cover plate, is mounted loosely upon a rod reciprocable in aligned apertures of the body member and normally urged upwardly by a spring, a pivotal lever being provided to move the table relative to the body member to unlatch an article from the elements or recess pins and position the table to receive parts for a second article.

Other objects and advantages will be apparent from the following detailed description when considered in conjunction with the accompanying drawings, wherein Fig. 1 is a vertical sectional view of the apparatus illustrating the parts of an article in position to be secured together;

Fig. 3 is a top plan view of the apparatus as shown in Fig. 1 with portions of the article and the handle broken away;

Fig. 4 is an enlarged detailed view of one of the locking elements;

Fig. 5 is a fragmentary sectional view taken along the line 5—5 of Fig. 4; and

Fig. 6 is an isometric view of a completed article, the parts of which have been secured together by the aid of the apparatus.

Figure 1:
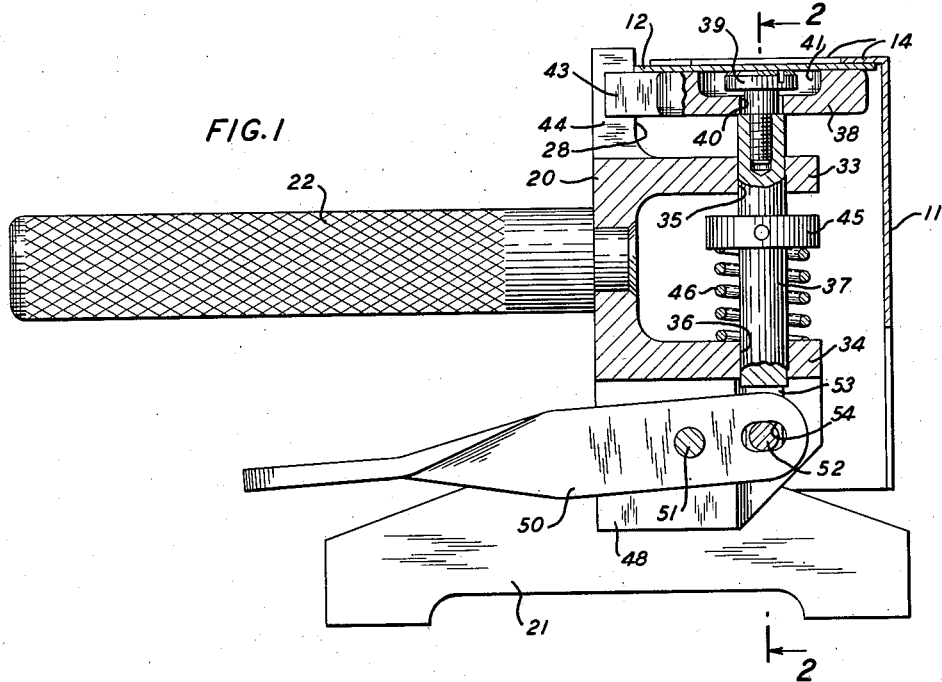

Referring now to the drawings, attention is first directed to Fig. 6 which illustrates an article indicated generally at 10 composed of a main member 11 and a cover plate 12. The main member 11 may be described as the first part and is substantially U-shaped in general contour with open ends, one of which is provided with inwardly bent flanges 14 to be secured subsequently to the cover plate or second part 12 by suitable means such as solder 15. The sides of the main member 11 have integral flanges 17 with apertures 18 at spaced positions therein. It will be apparent that the part 11 of the article, formed of relatively thin sheet metal, may be bent slightly out of position during handling, and as a result thereof, it would not be possible to accurately secure the parts together to complete an article of a given contour without suitable means to hold the part 11 with its portions accurately positioned with respect to each other and at the same time locating the cover plate or part 12 relative to the flanges 14.

Figure 2:
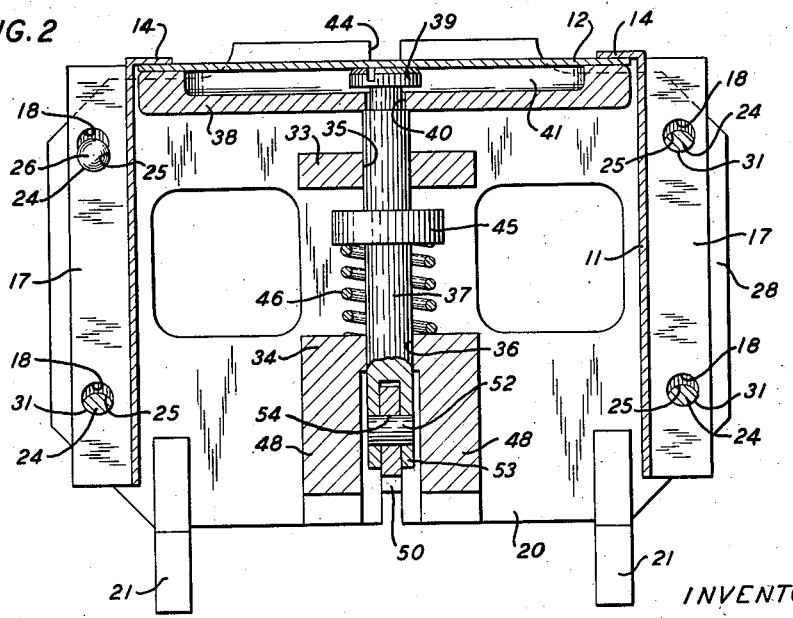
Fig. 2 is a vertical sectional view taken substantially along the line 2—2 of Fig. 1.

The apparatus for holding the parts 11 and 12 of the article 10 includes a body member 20 supported by legs 21 and carrying a handle 22 extending substantially parallel with the legs. Locking elements 24 in the form of pins are fixedly mounted in apertures 25 of the body member 20 at positions corresponding to the positions of the apertures 18 in the flanges 17. The outwardly projecting portions of the locking elements 24 include conical ends 26 to facilitate positioning the part 11 of the article in place on the body member 20 with the locking elements 24 extending through the apertures 18 and the leading surfaces of the flanges 17 engaging the locating face or surface 28 of the body member 20. The locking elements are also provided with recesses 30, the bottom surfaces 31 of which are arcuate to partially conform to the apertures 18 as illustrated in Fig. 2. The recesses 30 are wider than the thickness of the material of the flanges 17, the outer surfaces of the recesses being spaced from the surface 28 of the body member, a distance which is slightly greater than the thickness of the flanges 17 to permit the flanges to be interlocked therewith but to assure accurate positioning of the part 11 on the apparatus.

The body member 20 has parallel portions 33 and 34 integral therewith and provided with aligned apertures 35 and 36 to receive a supporting rod 37 for reciprocation therein. A table 38 is disposed upon the upper end of the rod 37 and held against displacement thereon by means of a screw 39. The aperture 40 in the table 38 for the screw 39 is sufficiently large to enable the table to move within given limits relative to the rod 37 whereby it may seek the plane of the part 12 and force it into intimate engagement with all of the flanges 14 of the part 11. The table 38 is rectangular in general contour and substantially the size of the part 12, the inner portion 41 of the table being reduced in thickness whereby the portions of the part 12 adjacent the flanges 14 will be engaged by the table to move them into intimate engagement with the flanges. A tongue 43 integral with the table 38 is positioned to ride in a vertical groove 44 of the body member 20 to hold the table against rotation during its reciprocable movement.

A collar 45 disposed concentric with and fixedly mounted on the rod 37 is engaged by the upper end of a spring 46, the lower end of the spring resting on the portion 34. The spring 46 normally urges the rod 37 upwardly and supplies the force necessary to hold the part 12 in position for assembly with the part 11. The portion 34 has downwardly extending parallel members 48 between which the inner end of a lever 50 is positioned and pivotally supported at 51. A pin 52, carried by a bifurcated lower end 53 of the rod 37, extends through an elongate aperture 54 in the lever 50. The outer end of the lever 50 extends beneath the handle 22 and by gripping both the handle and the lever the operator may readily actuate the lever about its pivot 51 to move the rod 37 downwardly with the table 38 against the force of the spring 46.

Upon considering the operation of the apparatus for assembling the parts 11 and 12 of the article 10, the part 12 is first placed upon the table 38, after which the operator grips the handle 22 and the lever 50 with one hand, actuating the lever against the force of the spring 46 to move the table downwardly a given distance. The part 11, held by the other hand of the operator, is moved toward the apparatus in such a manner that the flanges 14 will extend above the part 12 on the table 38 and the apertures 18 will register with and receive the locking elements 24 as the part 11 is moved toward the surface 28 of the body member 20. When the flanges 17 engage the surface 28 with the locking elements 24 extending through the apertures 18, the operator may release the lever 50 allowing the spring 46 to move the table 38 upwardly with the part 12. The part 12 will engage the flanges 14 and cause upward movement of the part 11 with the flanges 17 relative to the locking elements 24 forcing portions of the flanges into the recesses 30 where they will be locked against displacement and automatically positioned for the securing of the parts 11 and 12 together. Furthermore, the surface 28 of the body member 20 functions to position the part 12 whereby the adjacent edge thereof will be in a plane with the outermost surfaces of the flanges 17 which also engage the surface 28 so that when the part 12 is secured to the flanges 14 of the part 11, the article will be accurately formed. The accuracy in the formation of the article 10 is also assured through the positioning of the locking elements 24 making it necessary for the operator to flex the sides of the part 11 necessary for the mounting of the part on the locating elements should the sides of the part 11 be bent out of position prior to assembly with the part 12. The parts 11 and 12 are now in position to be secured together by solder or other means. The completed article may be readily removed from the apparatus by actuation of the lever 50 which will release the completed article for downward movement free of the locking elements 24, the apparatus at the same time being in position to receive the parts of another article.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for holding parts of an article to be secured together, the first part having an open end with an inwardly projecting flange and apertured side flanges, while the second part is formed to close the open end of the first part and engage the flange at the said open end, the apparatus comprising a body member, spaced elements carried by the body member, receivable in the apertures of the said side flanges and recessed to receive portions of the flanges about the apertures, a table to support the second part, and means to move the table relative to the body member to force the second part firmly against the flange at the said open end and thereby move the first part relative to the body member to force the portions of the side flanges into locking engagement with the elements.

2. An apparatus for holding parts of an article to be secured together, the first part having an open end with an inwardly projecting flange and apertured side flanges, while the second part is formed to close the open end of the first part and engage the flange at the said open end, the apparatus comprising a body member, spaced elements carried by the body member, receivable in the apertures of the said side flanges and recessed to receive portions of the flanges about the apertures, a table to support the second part, means to guide the table in a given path relative to the body member to accurately position the second part relative to the first part, and means to move the table relative to the body member to force the second part firmly against the flange at the said open end and thereby move the first part relative to the body member to force the portions of the side flanges into locking engagement with the elements.

3. An apparatus for holding parts of an article to be secured together, the first part having an open end with an inwardly projecting flange and apertured side flanges, while the second part is formed to close the open end of the first part and engage the flange at the said open end, the apparatus comprising a body member, spaced elements carried by the body member, receivable in the apertures of the said side flanges and recessed to receive portions of the flanges about the apertures, a table to support the second part, a reciprocable support for the table carried by the body member for movement in a given path relative to the spaced elements, and means normally urging the reciprocable support in a given direction to force the second part into close engagement with the flange at the said open end to move the first part into locking engagement with the spaced elements by forcing portions of the side flanges of the first part into the recesses thereof.

4. An apparatus for holding parts of an article to be secured together, the first part having an open end with an inwardly projecting flange and apertured side flanges, while the second part is formed to close the open end of the first part and engage the flange at the said open end, the apparatus comprising a body member, spaced elements carried by the body member, receivable in the apertures of the said side flanges and recessed to receive portions of the flanges about the apertures, a table to support the second part, a reciprocable support for the table carried by the body member for movement in a given path relative to the spaced elements, means normally urging the reciprocable support in a given direction to force the second part into close engagement with the flange at the said open end to move the first part into locking engagement with the spaced elements by forcing portions of the side flanges of the first part into the recesses thereof, and means to actuate the reciprocable support against the force of the last named means to move the table relative to the body member to free the parts.

5. An apparatus for holding parts of an article to be secured together, the first part having an open end with an inwardly projecting flange and apertured side flanges, while the second part is formed to close the open end of the first part and engage the flange at the said open end, the apparatus comprising a body having parallel integral members with aligned apertures therein extending outwardly from one side of the body, spaced pinlike locking elements carried by the body and having tapered outer ends, to facilitate their entering the apertures of the side flanges, and grooves with arcuate bottom surfaces to receive and partially conform to portions of the side flanges about their apertures, a support for the body, a table to support the second part, a support for the table reciprocable in a guided path in the aligned apertures of the parallel body members relative to the locking elements, and means normally urging the reciprocable support in a given direction to force the second part into close engagement with the flange at the said open end to move the first part into locking engagement with the spaced elements by forcing portions of the side flanges of the first part into the recesses thereof.

HENRY P. WESTER.

REFERENCES CITED

The following references are of record in the file of this patent:

UNITED STATES PATENTS

| Number | Name | Date |
| --- | --- | --- |
| 135,847 | Redheffer | Feb. 11, 1873 |
| 137,027 | Redheffer | Mar. 18, 1873 |
| 2,095,964 | Blickman | Oct. 19, 1937 |